No. 492.
REISSUED SEPT. 15, 1857.
C. WINSLOW.
MANUFACTURE OF ELASTIC GORE CLOTH.
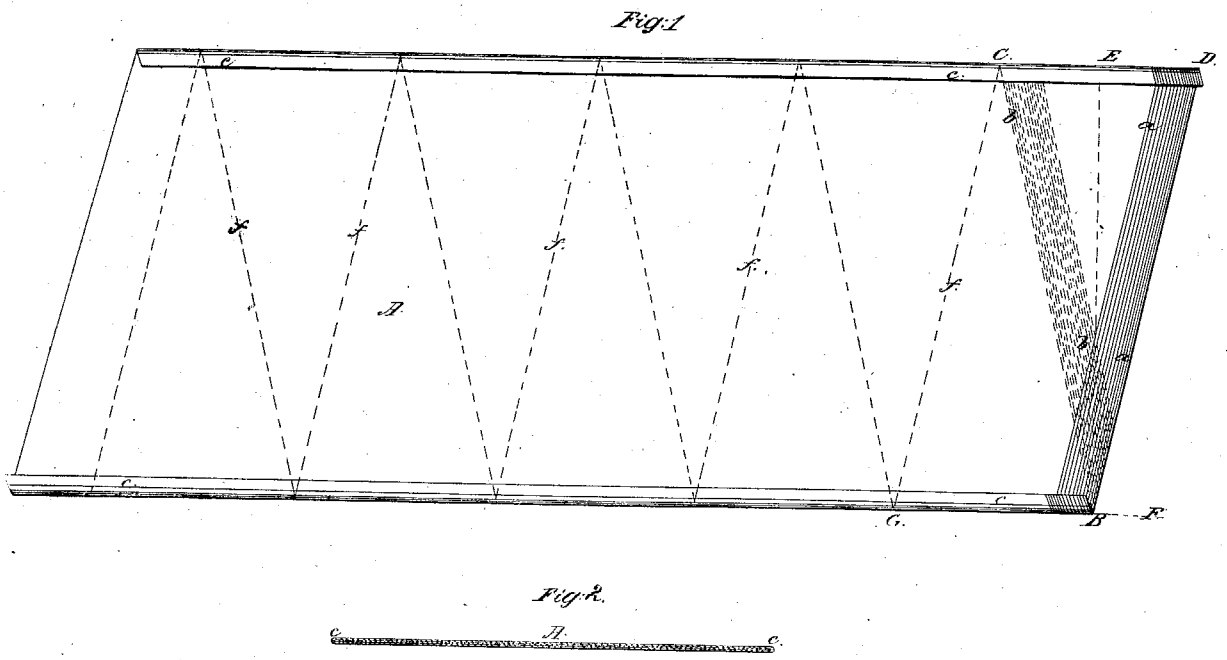

UNITED STATES PATENT OFFICE.

CHARLES WINSLOW, OF LYNN, MASSACHUSETTS.

IMPROVEMENT IN ELASTIC GORE CLOTH.

Specification forming part of Letters Patent No. 17,950, dated August 4, 1837; Reissue No. 492, dated September 15, 1857.

*To all whom it may concern:*

Be it known that I, CHARLES WINSLOW, of Lynn, in the county of Essex and State of Massachusetts, have invented an Improvement in the Manufacture of Elastic Gore Cloth; and I do hereby declare that the same is fully described and represented in the following specification and the accompanying drawing, of which—

Figure 1 exhibits a strip of elastic gore cloth having its edges turned over and arranged with reference to its warp and weft in accordance with my invention.

The elastic fabric on which my invention is based is either one made of common cloth stretched and united by an elastic cement or that for which Letters Patent of the United States of America were granted on the 6th day of May, A. D. 1856, to Henry G. Fyer and John Helm, such elastic fabric being composed of two pieces of cloth, either woven or otherwise made with the threads of the weft in a diagonal position or at an acute angle to the threads of the warp, and combined and caused to adhere together by a cement composed either of india-rubber or gutta-percha, the two pieces of cloth being united by the compound and the latter being afterward vulcanized or not, as circumstances may require.

In carrying out my improvement I take of such fabric a strip of a width somewhat greater than it is to be when finished for being cut into elastic gores or made into an elastic band or belt, and I turn over and cement down upon the main part of the strip, and by a suitable rubber cement or like composition, each edge of the material, lapping it upon the main part of the strip about a quarter of an inch, or such other distance as may be desirable in order to imitate binding; and, furthermore, previous to the said strip having its edge or edges so turned down and cemented, each edge to be turned is to be cut on an acute angle to or out of parallelism with either the filling or the warp threads.

For obtaining the maximum elasticity the cut may be made at an acute angle with the filling of the cloth, and also at an acute angle with the warp-threads, in order that when the edge is overlapped and turned down the line of bend of it may be not only at such an acute angle with either the warp or weft threads as shall be the complement of half the angle which they make with each other.

In the drawing the directions of the warp-threads are indicated by black lines at *a a*, while those of the filling are denoted by red lines, as shown at *b b*, A being the strip of cloth having its opposite parallel edges turned down or overlapped upon the rest of the cloth, as shown at *c c*, and also in Fig. 2, which is a transverse section of the fabric. By thus arranging the overlap with respect to the warp and weft elasticity is secured longitudinally in the binding, so as not to counteract the elasticity of the remainder of the cloth. Furthermore, the edges are prevented from either fraying out or being torn, they being much strengthened, and a finish is given to the cloth. I would remark that the strip is inelastic widthwise in direction of either warp or weft, and elastic only in the direction lengthwise or out of parallelism with either warp or weft. The blue lines *f f* exhibit the manner in which the strip is to be cut into elastic gores, each gore being either of a trapezoidal or triangular shape or an approximation thereto, as circumstances may require.

I am aware that an elastic cloth has been made as a shirred fabric. This, however, differs essentially from the "elastic gore cloth" made in accordance with my invention, as the edge of the former is turned over parallel to the warp.

I do not claim the peculiar elastic cloth as made with its filling arranged at an acute angle with its warp; nor do I claim the elastic fabric as made of two layers of such cloth combined; but What I do claim as an improved manufacture is—

An elastic band or gore cloth when made not only of a fabric composed of a cement of india-rubber or gutta-percha and two pieces of cloth, in which the warp and weft of each piece are made to cross one another diagonally or at acute angles, but with the edges of the cloth cut and overlapped and cemented down in a line or lines out of parallelism with either the warp or weft threads, the line of maximum elasticity in the binding making that angle with the warp as well as the weft which is the complement of half the angle which they make with each other.

In testimony whereof I have hereunto set my signature this 8th day of August A. D. 1857.

CHARLES WINSLOW.

Witnesses:

R. H. EDDY,

ARTHUR NEILL.